(12) United States Patent
Chandrashekhara et al.

(10) Patent No.: US 11,237,916 B2
(45) Date of Patent: Feb. 1, 2022

(54) EFFICIENT CLONING OF LOGICAL STORAGE DEVICES

(71) Applicant: EMC IP Holding Company LLC, Hopkinton, MA (US)

(72) Inventors: Sandeep Chandrashekhara, Shrewsbury, MA (US); Michael Ferrari, Douglas, MA (US); Jeffrey Wilson, Franklin, MA (US); Mark J. Halstead, Holliston, MA (US); Art Longden, Charlton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 14 days.

(21) Appl. No.: 16/692,742

(22) Filed: Nov. 22, 2019

(65) Prior Publication Data

US 2021/0157678 A1    May 27, 2021

(51) Int. Cl.
*G06F 11/14*        (2006.01)
*G06F 12/1009*    (2016.01)

(52) U.S. Cl.
CPC ...... *G06F 11/1456* (2013.01); *G06F 12/1009* (2013.01); *G06F 2201/82* (2013.01); *G06F 2212/1032* (2013.01)

(58) Field of Classification Search
CPC ............. G06F 11/1456; G06F 12/1009; G06F 2212/1032; G06F 2201/82; G06F 2212/224; G06F 2212/261; G06F 12/0868

USPC ......................................................... 711/206
See application file for complete search history.

(56) References Cited

U.S. PATENT DOCUMENTS

| 5,809,228 A * | 9/1998 | Langendorf | G06F 12/0215 365/189.05 |
| 7,716,435 B1 * | 5/2010 | Allen | G06F 11/1458 711/162 |
| 9,965,216 B1 * | 5/2018 | Jaganathan | G06F 11/1458 |
| 2016/0147671 A1 * | 5/2016 | Vishne | G06F 12/12 711/135 |

* cited by examiner

*Primary Examiner* — David Yi
*Assistant Examiner* — Zubair Ahmed
(74) *Attorney, Agent, or Firm* — Muirhead and Saturnelli, LLC

(57) ABSTRACT

A no-copy clone of a logical storage unit is created. A define process is initiated for defining a target logical storage unit as the clone before activation of the target logical storage unit. By initiating the define process before activating the logical storage unit, there is a greater likelihood that, when a write operation is received for a data portion on the source logical storage unit or target logical storage unit after activation of the target LSU, the data portion will already be defined and not need to be defined when performing the write operation. When a write operation is received at the source logical storage unit, if the target logical storage unit is not active yet, the data of the write operation may be written to an allocated physical location for the data portion shared between the source and target logical storage units without updating any clone metadata.

20 Claims, 9 Drawing Sheets

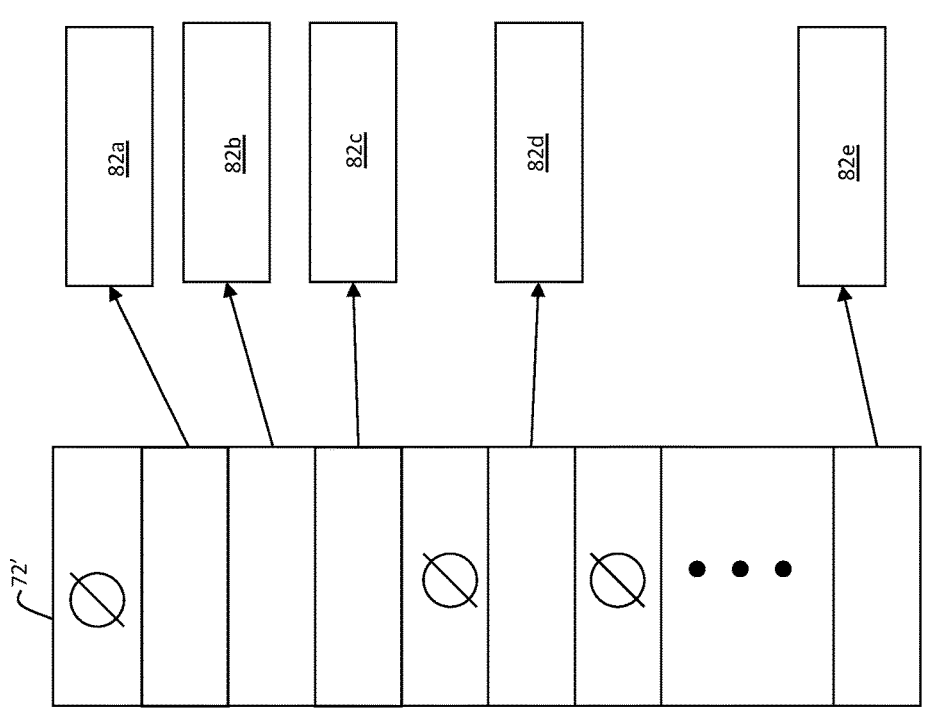

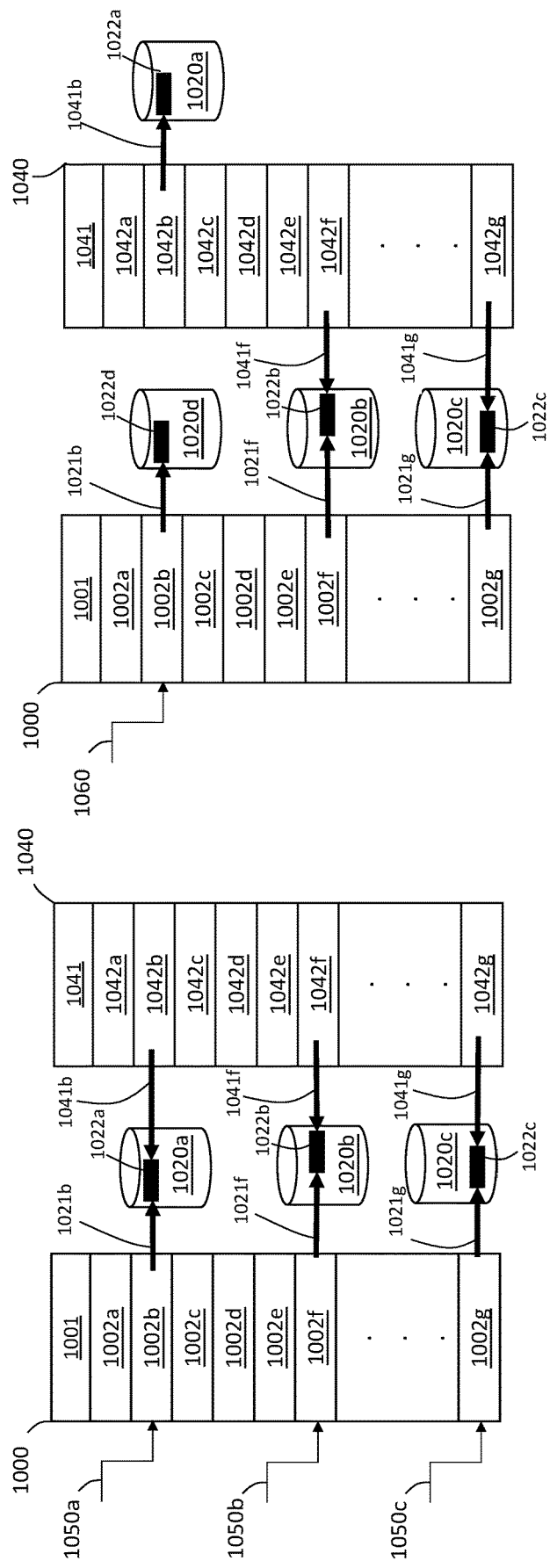

EFFICIENT CLONING OF LOGICAL STORAGE DEVICES

BACKGROUND

Technical Field

This application generally relates to data storage systems, and more particularly to cloning logical storage units on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used.

Host systems may not address the physical storage devices (e.g., disk drives or flash drives) of a storage systems directly, but rather access to data may be provided to one or more host systems from what the host systems view as a plurality of logical storage units (LSUs) including, for example, logical blocks, logical devices (also referred to as logical volumes, LUNs, logical storage units and/or logical disks), thin devices, groups of logical devices (e.g., storage groups), NVMe namespaces, and other types of LSUs. LSUs are described in more detail elsewhere herein.

SUMMARY OF THE INVENTION

In some embodiments, a method is provided for a system including a plurality of physical storage devices for storing data and a plurality of logical storage units, each logical storage unit including a plurality of data portions, each data portion corresponding to one or more physical locations within the plurality of physical storage devices, a method of establishing a target logical storage unit as a point-in-time image of a source logical storage unit. The method includes: initiating an establishing of the target logical storage unit as the point-in-time image of the source logical storage unit using metadata associated with the source logical storage unit, initiating a defining of a state of a target mapping table to map data portions of the target logical storage unit to physical locations on the plurality of logical storage units that are mapped to data portions of the source logical storage unit corresponding to the data portions of the target logical storage device, and, after initiating the defining, activating the target logical storage unit, including enabling access to the target logical storage unit by one or more host systems. The target mapping table may include a plurality of entries, each entry representing a data portion of the target logical storage unit, and the defining may include, for each entry of the target mapping table: accessing a corresponding entry in a source mapping table, determining whether the corresponding entry specifies a physical location on the plurality of devices allocated to the data portion, and, if the corresponding entry specifies a physical location, updating the entry in the target mapping table for the data portion to specify the physical location. The defining of the state of the target mapping table may be completed before the activating of the target logical storage unit. The method may include: after initiating the establishing of the target logical storage unit and prior to the activating of the target logical storage unit, receiving a write operation for a data portion of the source logical storage unit, and writing data of the write operation to an allocated location on the plurality of physical devices specified by an entry of the source data structure representing the data portion, where the writing is performed without allocating any new physical locations on the plurality of storage devices to the source logical storage unit or the target logical storage unit. The data may be written to the allocated location without modification of either of the target mapping table or a source mapping table that maps data portions of the source logical storage unit to physical locations on the plurality of physical storage devices. The method may include: after the activating of the target logical storage unit, receiving a write request for a first data portion of the source logical storage unit, determining whether the write request is a first write request for the first portion since the target logical storage unit was activated, and, if it is determined that the write request is the first write request for the first portion since the target logical storage unit was activated: allocating a new physical location on the plurality of physical storage devices to the data portion for the source logical storage unit, updating an entry of a source mapping table of the source logical storage unit corresponding to the data portion to specify the new physical, and writing the data of the write request to the new physical location. The method may include, after activating the target logical storage unit, updating a sequence number of the source logical storage unit and updating a sequence number of the target logical storage unit.

In some embodiments, a system includes a plurality of physical storage devices for storing data, a plurality of logical storage units, each logical storage unit including a plurality of data portions, each data portion corresponding to one or more physical locations within the plurality of physical storage devices, and memory having code stored thereon that, when executed, performs the above-described method of establishing a target logical storage unit as a point-in-time image of a source logical storage unit.

In some embodiments, one or more computer-readable media, for example, non-transitory computer-readable media, are provided for a system including a plurality of physical storage devices for storing data and a plurality of logical storage units, each logical storage unit including a plurality of data portions, each data portion corresponding to one or more physical locations within the plurality of physical storage devices. The one or more computer-readable media has software stored thereon that includes executable instructions to perform the above-described method of establishing a target logical storage unit as a point-in-time image of a source logical storage unit.

BRIEF DESCRIPTION OF THE DRAWINGS

Features and advantages of the present invention will become more apparent from the following detailed description of illustrative embodiments thereof taken in conjunction with the accompanying drawings in which:

FIG. 4 a block diagram illustrating an example of a table used for a thin logical device, according to embodiments of the invention;

FIG. 5 is a block diagram showing a sequence number table, according to embodiments of the invention;

FIG. 6 is a block diagram showing a sequence number pointer table, according to embodiments of the invention;

FIGS. 10A-10E are block diagrams illustrating an example of the creation and use of a clone of a logical storage unit, according to embodiments of the invention;

DETAILED DESCRIPTION OF EMBODIMENTS

Figure 1:
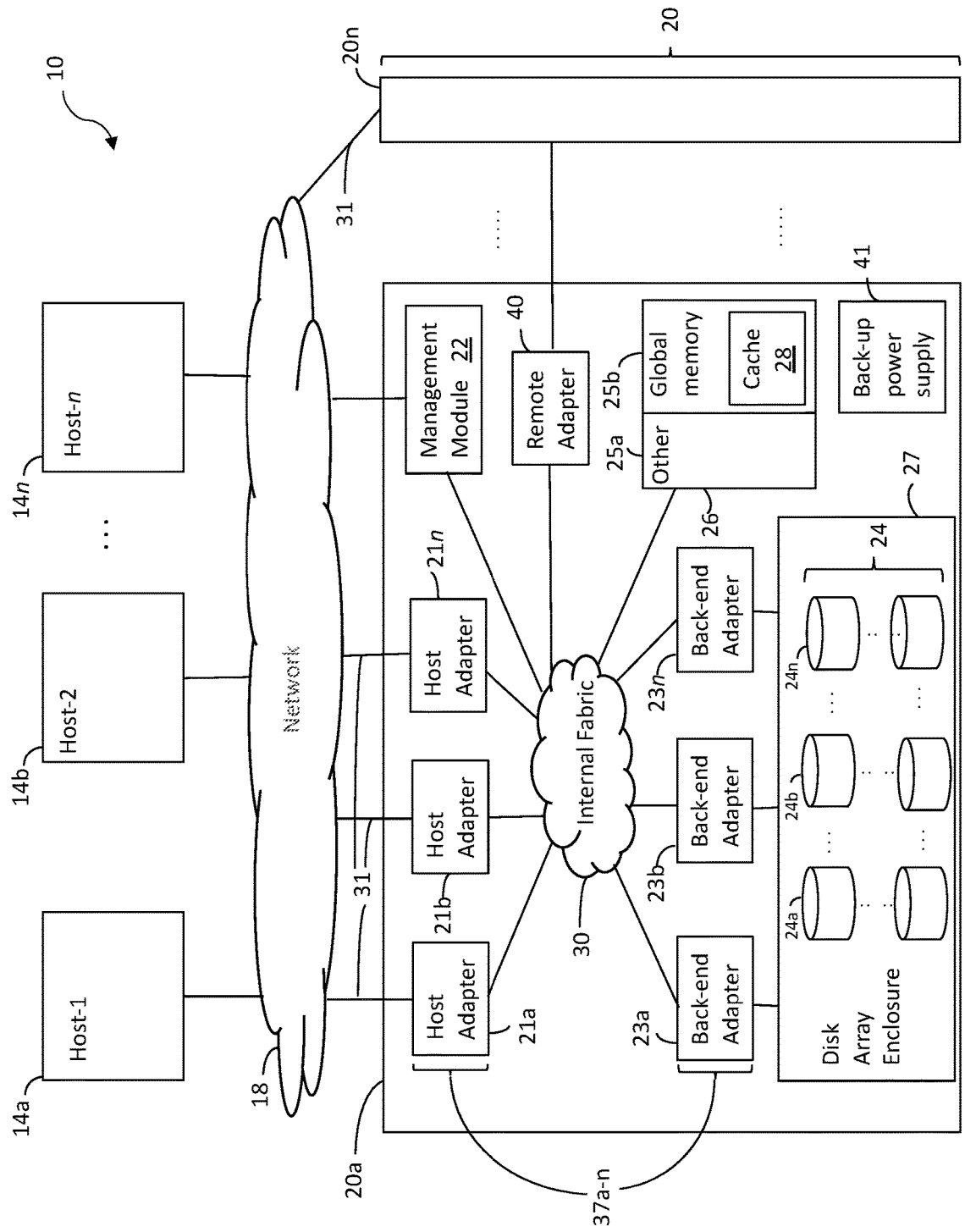
FIG. 1 is a block diagram illustrating an example of a data storage network, according to embodiments of the invention.

On a data storage system, it may be desirable to record a state of an LSU at a given point in time, i.e., to create a point-in-time image or view of the LSU, which is often referred to herein as a "clone." It may be desirable to create clones for any of a variety of reasons, for example, to create different data sets for software development and quality assurance testing, resolving customer issues, and restoring data after a failure, to name a few.

An LSU may be considered to include I/O data (e.g., the actual data being stored for one or more application) and metadata defining the LSU, the metadata including information specifying (among other things) physical storage locations of the LSU's data on physical storage devices of the data storage system. A clone of an LSU may be referred to herein as "clone target LSU" or "target LSU" or "target" and the LSU being cloned may be referred to herein as a "clone source LSU" or "source LSU" or "source." The process of establishing an LSU as a clone of another LSU, e.g., of creating a clone, may be referred to herein as a "cloning session."

An LSU may include a plurality of data portions, each data portion representing a logical portion of the LSU, for example, a logical track (or "track") of data. A track of data may be defined to have a certain size, for example 128 KB, or another size. For each data portion, a physical location on a physical storage device may be allocated to the data portion, for storing the I/O data of the data portion. A physical location may be defined as a logical block address (LBA) range, for example, as a starting LBA plus a length or size (e.g., in terms of blocks or bytes). In some embodiments, a block may be 512 bytes in size such that, in some embodiments, there are 256 blocks per track.

In some embodiments, a data structure may be provided that maps each data portion of an LSU to the physical location allocated to the data portion of a physical storage device, e.g., by specifying a physical storage device and an LBA range on the physical storage device. Such a data structure may be referred to herein as an "LSU mapping table" or "mapping table," as described in more detail elsewhere herein. An LSU mapping table may include a plurality of entries, where each entry represents a data portion and may specify a physical location allocated to the data portion, if any. An LSU mapping table for a source LSU may be referred to herein as a "source LSU mapping table" or "source mapping table" and an LSU mapping table for a target LSU may be referred to herein as a "target LSU mapping table" or "target mapping table." A mapping table, of a source or target, may be just one of a plurality of data structures that collectively constitute the metadata of an LSU.

Creating a target LSU includes copying at least some (e.g., all) of the metadata of the source LSU. For example, creating a target LSU may include creating or updating a target mapping table, each entry of the target mapping table and the data portion it represents corresponding to a respective entry of a source mapping table of the source LSU and the data portion it represents. In some embodiments, a separate copy of the data may be made for the target LSU, in which case the target LSU may be referred to herein as a "copy target" and the process of creating the copy target as a "target copy session" or "copy session." The target copy process may include, for each entry of the source mapping table that specifies a physical location allocated to the data portion represented by the entry, allocating a new physical location to the data portion of the corresponding entry of the target mapping table, and then copying the data from the physical location specified by the entry of the source mapping table to the physical location specified in the corresponding entry in the target mapping table. A target copy session results in a full copy of the source LSU data being made for the target LSU.

In some embodiments, rather than making a separate full copy of the underlying data for the target LSU, initially the target LSU and source LSU share the same data, and it is only when changes are made to the source LSU or target LSU after creation of the target LSU that the physical storage allocations of the source and target LSUs diverge. In such embodiments, the target LSU may be referred to herein as a "no-copy target" and the process of creating the no-copy target as a "target no-copy session" or "no-copy session."

A cloning session may include initiating the cloning session, which sets in motion the process of establishing the clone LSU, details of which are described in more detail elsewhere herein. The cloning session also may include activating the target LSU such that the target LSU is available to process I/O for host systems. For a copy session, a copying of the data from the source LSU to the target LSU may initiate after the target LSU has been activated. In some embodiments, the copying of data for a copy session initiates before activating the target LSU, such copying referred to herein as "pre-copying", where the copy session may be referred to herein as a "pre-copy session." A benefit of pre-copying is that, when the target LSU is activated, it is ready to process I/O operations from the new allocated physical locations without having to first allocate the new physical locations and copy the data there, which introduces delay and consumes computational resources. Further, such allocation and copying after activation during performance of the I/O operation may be given more priority (e.g., to meet performance objectives) than if the allocating and copying had been done in the background, placing further demands on system resources, whereas the allocating and copying of a pre-copy session may be done in the background, which does not demand priority treatment and thus puts less strain on system resources.

A potential drawback of pre-copying source data is that, during the pre-copy session, when a write operation is received for the source LSU, the target metadata needs to be updated to reflect that a write is pending on the source LSU (until the write data is de-staged from cache to a physical storage device), and, when the data is de-staged to the physical storage device (e.g., a disk drive), the target metadata again needs to be updated and the data needs to be copied to the target LSU. This additional updating of metadata and copying of data adds computational overhead to a clone session.

A no-copy session consumes less storage resources than a copy session. As described above, rather than creating a full copy of the data, including allocating new physical storage and copying data for all data portions, initially the target LSU and source LSU share the same data for a no-copy session, and it is only when changes are made to the source LSU or target LSU after activation of the target LSU that the physical storage allocations of the source and target LSUs diverge, involving allocating new physical locations and copying data. A no-copy session may include defining a state of the LSU after the target LSU is activated, which may be referred to herein as the "define process." The define process may include traversing the entries of a target mapping table, and defining each entry to specify a same physical location, if any, as the physical storage location of the corresponding entry in the source mapping table.

While the define process may be performed in the background, write operations for the source LSU and target LSU (which was activated before the define process began) may be received. If a write operation is received for a data portion of the source LSU or target LSU before the data portion is defined on the target LSU—i.e., before the entry in the target mapping table representing the data portion has been modified to specify the physical location of the corresponding entry in the source LSU—then the data portion must be defined, including a new physical location being allocated and the source mapping table and/or target mapping table being updated. Performing these actions as part of performing the write operation, as opposed to as part of a background define process, may introduce delay into the performance of the write operation. Moreover, completing the define process may take a relatively significant amount of time, perhaps several minutes, several hours or even longer, depending on the size of the target LSU. If the target LSU receives write operations at a high frequency while the target LSU is being defined, the performance of the system as a whole may suffer.

What may be desirable is a clone process that has the storage space-saving benefits of a no-copy process without the potential performance degradation caused by executing the define process after activation of the target LSU.

Described herein are mechanisms and techniques for implementing a no-copy process in which a define process is initiated, and in some embodiments completed, before activation of the target LSU. By initiating the define process before activating the LSU, there is a greater likelihood that, when a write operation is received for a data portion on the source LSU or target LSU after activation of the target LSU, the data portion will already be defined and will not need to be defined at the time of performing the write operation. In some embodiments, the activation process is completed before activating the target LSU such that defining a state of a data portion at the time of a write operation may be avoided altogether.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs).

Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots, which may be a of a predefined uniform size, for example, 128Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
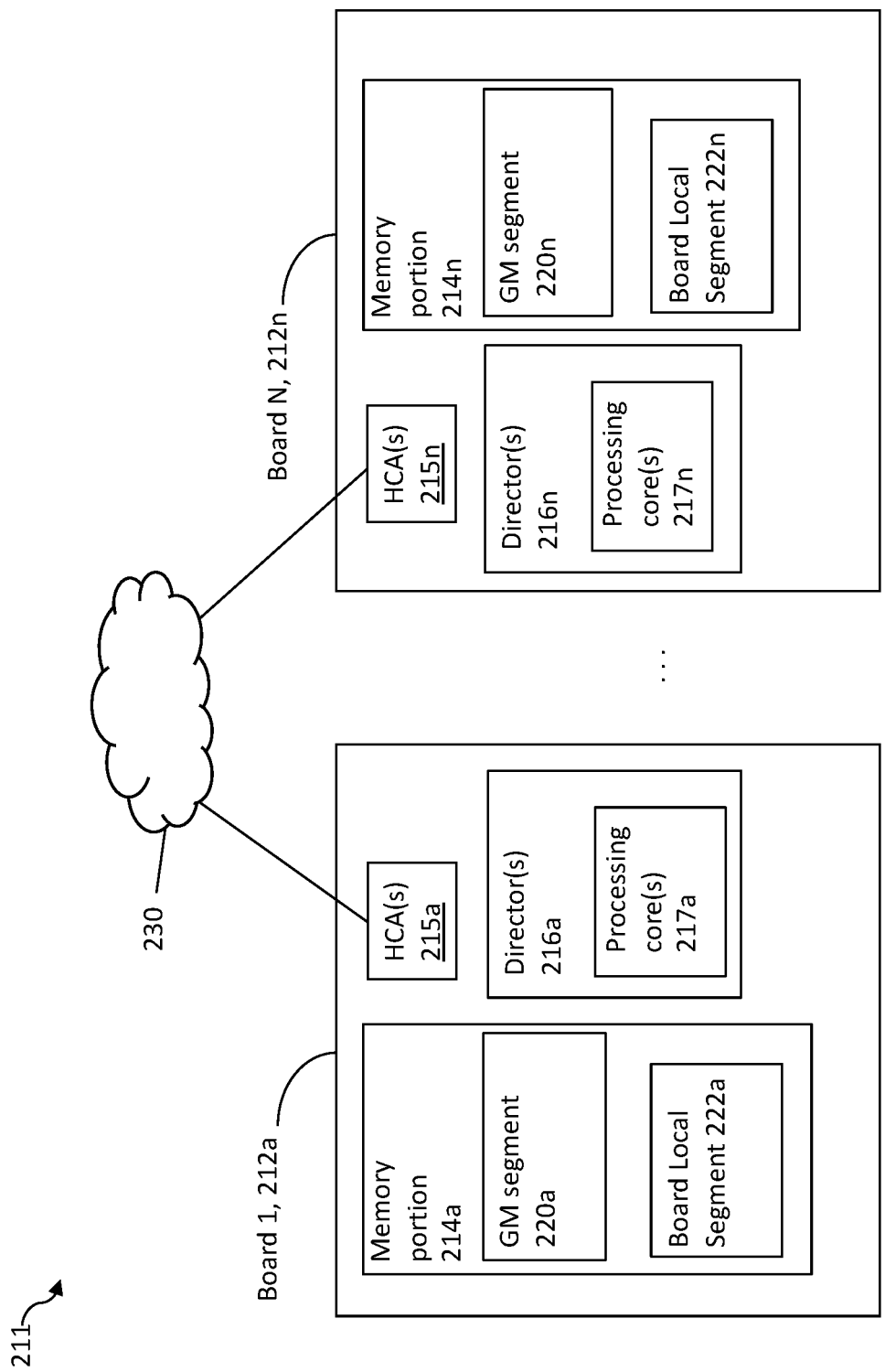
FIG. 2 is a block diagram illustrating an example of a storage system including multiple circuit boards, according to embodiments of the invention.

Any of storage systems 20a-n, or one or more components thereof, described in relation to FIGS. 1-2 may be implemented using one or more Symmetrix, VMAX, VMAX3 or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of logical storage units (LSUs) including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple boards 212a-212n. Storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module)

DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or board local segments 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3:
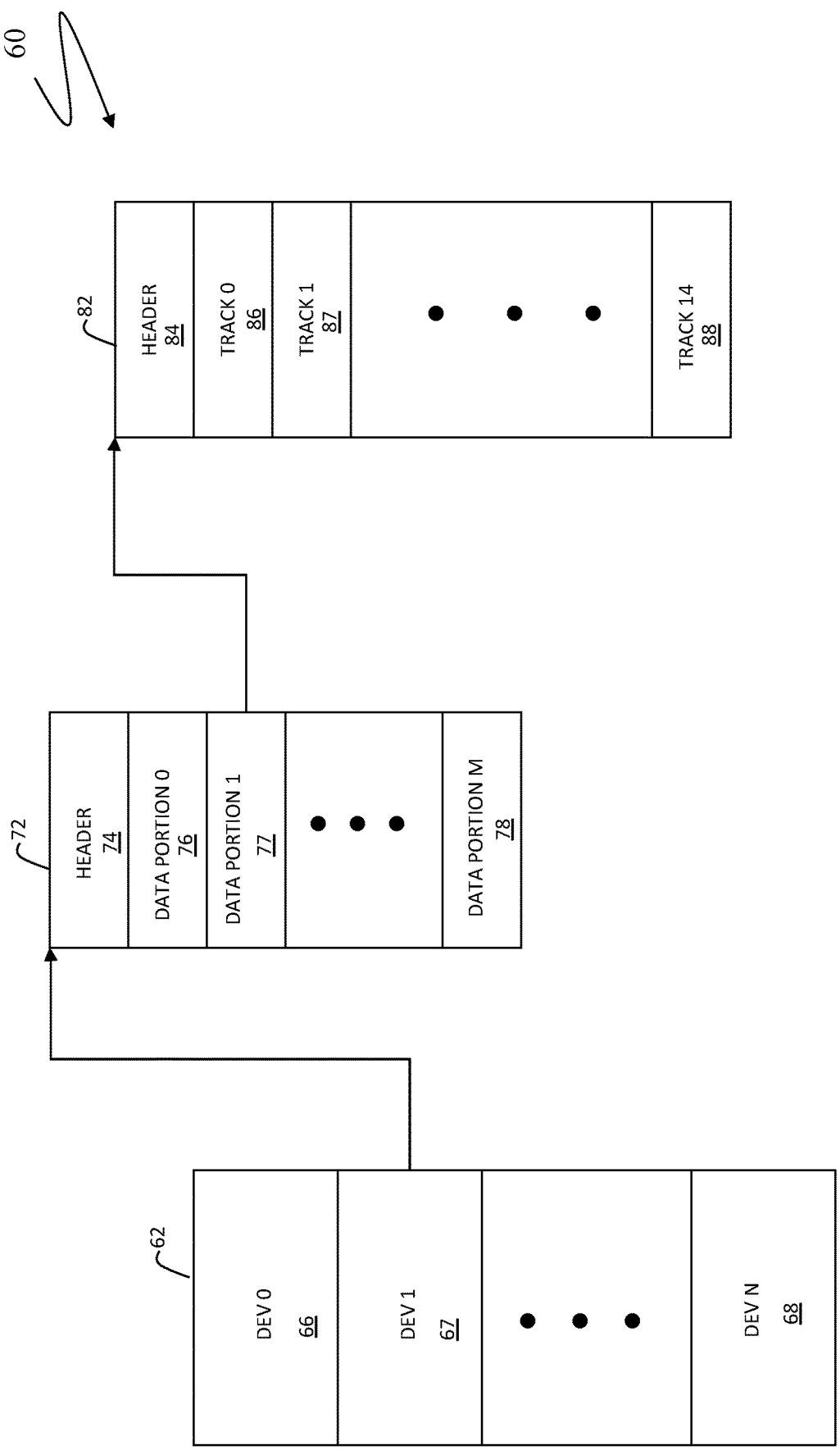
FIG. 3 is a block diagram illustrating an example of tables defining relationships between logical storage units and physical storage devices on a data storage system, according to embodiments of the invention.

FIG. 3 is a block diagram illustrating an example of tables 60 defining relationships between LSUs and physical storage devices on a data storage system, according to embodiments of the invention. A first table 62 corresponds to the LSUs (e.g., logical devices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20*a* (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 500, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein.

FIG. 4 is a diagram illustrating an example of a table 72' used for a thin logical device (i.e., a thin LSU), which may include null pointers as well as entries similar to entries for the LSU table 72, discussed above, that point to a plurality of LSU track tables 82*a*-82*e*. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

In some embodiments of the invention, clones may be employed, for example, no-copy clones. In such embodiments, data structures such as a sequence number table, a sequence number pointer table, LSU mapping tables and other data structures may be employed, as will now be described.

Referring to FIG. 5, a sequence number table 120 corresponding to an LSU is provided. The sequence table number 120 includes a plurality of entries corresponding to particular points in time at which a clone was activated in relation to the LSU (i.e., a clone for which the LSU is the target or the source is activated). Each of the entries includes a sequence ID and a sequence number. The sequence ID may be used to identify a particular clone and could be text (e.g., "Mar. 12, 2014, 8:00 am clone") or could be a token that is used by other software (not shown herein) to identify each of the clones. Sequence numbers may be used in connection with providing clones as described in more detail herein. In some embodiments, an LSU may have one sequence number table for one or more clone sessions, if any, for which the LSU is the source LSU, and another sequence number table for clone sessions for which the LSU is the target LSU, if any.

Referring to FIG. 6, a sequence number table 130 is shown as having a plurality of entries. Each of the entries of the table 130 contains a sequence number. The table 130 can contain a single entry for each data portion (e.g., track or other appropriate data increment) of an LSU (e.g., logical device or thin device for which clones are being provided). Thus, for example, if there are one hundred data portions in an LSU, there are one hundred entries for sequence numbers in the table 130. As described in more detail elsewhere herein, a single LSU may serve a role as a target LSU and a role as a source LSU. In some embodiments of the invention, there are two sequence number tables for a given LSU, one sequence number table specifying the sequence number of each data portion of the LSU its role as a target and the other sequence number table specifying the sequence number of each data portion of the LSU its role as a source. In some embodiments, rather than having one or more separate sequence number tables 130 for a given LSU, the target sequence number and source sequence number of each data portion of the LSU may be specified in an LSU mapping table of the LSU, as described in more detail elsewhere herein.

Figure 7:
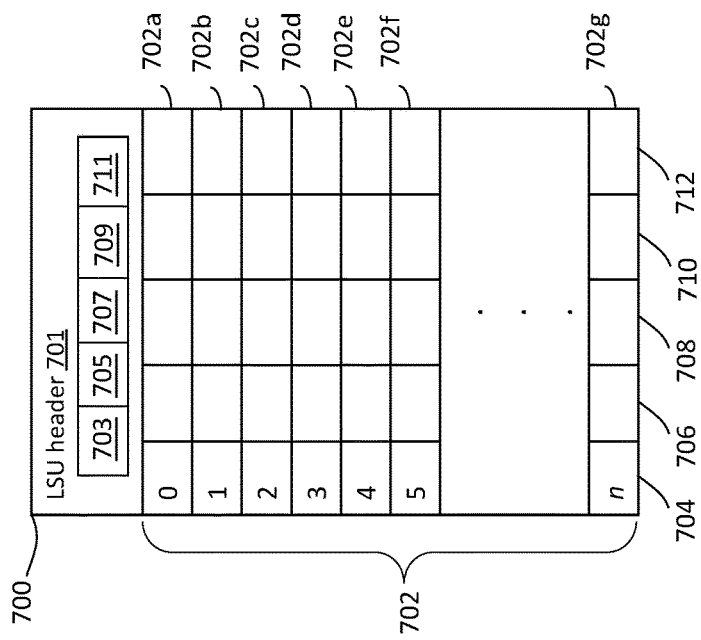
FIG. 7 is a block diagram illustrating an example of a data structure for mapping data portions of a logical storage units to physical storage locations, according to embodiments of the invention.

FIG. 7 is a block diagram illustrating an example of a data structure 700 for mapping data portions of an LSU to physical storage locations, according to embodiments of the invention. Other embodiments of a data structure for mapping data portions of an LSU to physical storage locations, for example, variations of the data structure 700, are possible and are intended to fall within the scope of the invention. Data structure 700 may be referred to herein as an LSU mapping table, although it should be appreciated that other types of data structures may be used. For an LSU, the LSU mapping table 700 may include, or be part of, the LSU track table 82 described in more detail herein, or the LSU mapping table 700 and the track table 82, or parts thereof, may be included in another data structure for the LSU.

LSU mapping table 700 may include a header 701 and a plurality of entries 702, including entries 702*a*-*g*. The LSU header 701 may include metadata about the LSU it represents, including, for example, any of: an LSU ID 703; an LSU status 705; clone metadata 707 for one or more clone relationships involving the LSU; a source sequence number 709; a target sequence number 711; other metadata; or any suitable combination of the foregoing. The LSU status 705 may specify whether the LSU is active, meaning that it is available to process I/O for one or more host systems, or inactive.

In some embodiments, an LSU may be involved in one or more clone relationships. For example, multiple clones of a single LSU may be created, such that the LSU is a source LSU to multiple target LSUs. Further, an LSU may be a target LSU in one clone relationship whereas it may be a source LSU in multiple other clone relationships. For example, a first LSU may have been activated as a target LSU of a second LSU, and subsequently, one or more clones of the first LSU may be created in which the first LSU is the source and one or more other LSUs are the target LSU. The clone metadata 707 may include metadata for each such clone relationship, including, for example, any of: a role of the LSU (e.g., target or source) in the clone relationship; the LSU ID of (or reference or other pointer to) the other LSU in the LSU relationship; the activation status (e.g., active, inactive) of the target LSU in the clone relationship; and other information. The source sequence number 709 may specify the sequence number of the LSU in its role as a source in one or more clone relationships, and the target sequence number 711 may represent the sequence number of the LSU in its role as a target in a clone relationship. The clone metadata 707, source sequence number 709 and target sequence number 711 may be used to implement no-copy clones, as described in more detail elsewhere herein.

Each of the entries 702 may represent a data portion (e.g., a track) of an LSU. For example, in some embodiments, if there are one hundred data portions in an LSU, there are one hundred entries 702. Each entry may specify one or pieces of metadata corresponding to the data portion, including, for example: a data portion (e.g., track) ID of the data portion in data portion ID column 704, a physical location of the data portion on a physical storage device in physical location column 706, if any, allocated to the data portion; a source sequence number of the data portion for the role of the LSU as a source in one or more clone relationships in a data portion (DP) source sequence number column 708; a target sequence number of the data portion for the role of the LSU as a target in one or more clone relationships in a data portion (DP) target sequence number column 710; a target state of the data portion (e.g., defined or undefined) with respect to the LSU's role as a target LSU in a state column 712; other metadata; or any suitable combination of the foregoing. The metadata within each entry may be used to implement no-copy clones in accordance with embodiments of the invention.

For each data portion of the LSU, the value of target state may define the state of the data portion as "defined" or "undefined." A defined state means that the entry (e.g., 702a-g) has been updated as part of the clone creation process to specify the allocated physical location of the data of the corresponding data portion of the source LSU. An undefined state means that this update has not yet occurred as part of the clone creation process. In some embodiments, in addition or as an alternative to specifying the target state of each data portion in entry 702, a bitmap may be used, where the bitmap includes a field for each data portion in the LSU and has a bit set or cleared to reflect whether the data portion is defined as a target clone.

It should be appreciated that the information provided in the LSU mapping table 700 may be provided using one or more different data structures, independently or in combination with the LSU mapping table.

Figure 8:
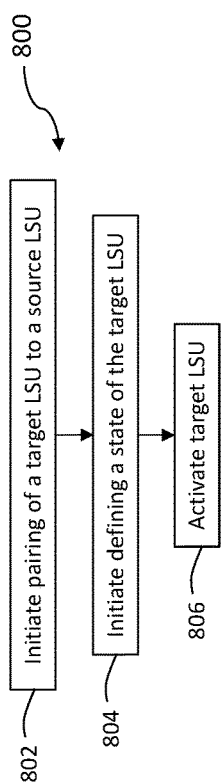
FIG. 8 is a flowchart illustrating an example of a method of creating a clone of a logical storage unit, according to embodiments of the invention.

FIG. 8 is a flowchart illustrating an example of a method 800 of creating a clone of an LSU, according to embodiments of the invention. Other embodiments of a method of creating a clone of an LSU, for example, variations of the method 800, are possible and are intended to fall within the scope of the invention.

In a step 802, a pairing of a target LSU to a source LSU—i.e., the establishment of a clone relationship, may be initiated, which may include, for example, updating the clone metadata (e.g., the clone metadata 707) for the source LSU and the target LSU.

In a step 804, the define process for the target LSU may be initiated. The define process may include traversing the entries of the target mapping table of the target LSU, and defining each entry to specify a same physical location, if any, as the physical storage location of the corresponding entry in the source mapping table, for example, by performing a method 900 described in relation to FIG. 9.

Figure 9:
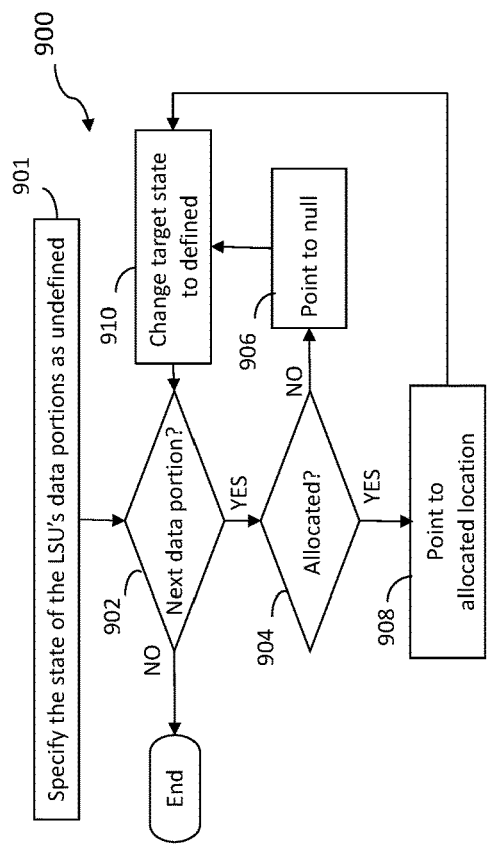
FIG. 9 is a flowchart illustrating an example of a method of defining a state of a clone of a logical storage unit, according to embodiments of the invention.

FIG. 9 is a flowchart illustrating an example of the method 900 of defining a state of a clone of an LSU, according to embodiments of the invention. Other embodiments of a method of defining a state of a clone of a logical storage unit, for example, variations of the method 900, are possible and are intended to fall within the scope of the invention.

In a step 901, the state of each data portion (e.g., track) of the target LSU may be changed to undefined—i.e., cleared. For example, this clearing may be accomplished for each data portion by setting the target state field 712 in the entry 702 for the data portion in the LSU mapping table 700 for the target LSU to "0" or by setting a bit for the data portion in a bitmap for the LSU to "0" (i.e., clearing the target state bit). As a result, in some embodiments, before a first pass through the loop defined by steps 902-910, the target bits of all of the data portions of the LSU have been cleared.

In a step 902, a next data portion in the target LSU mapping table may be determined, for example, a first data portion of the target LSU on a first performance of the step 904. The next data portion may be determined by accessing a next entry 702 of the target LSU's mapping table 700, or another data structure (e.g., index) derived from the mapping table. If there is no next data portion, then the method 900 may end. Otherwise, control may transfer from the step 902 to a step 904, where it may be determined whether a corresponding data portion of the source LSU has been allocated a location on a physical storage device, for example, by accessing physical location column 706 of the entry 702 for the data portion in the source LSU's mapping table.

If it is determined in the step that no physical storage device location has been allocated to the data portion on the source LSU (e.g., the column 706 has no a null value), then control may transfer to a step 906 where the entry in the target LSU mapping table for the data portion may be set to null. Otherwise, control may transfer to a step 908, where the value in physical location field 706 of the entry in the target LSU mapping table for the data portion may be set to the same physical location specified in the field 706 of the corresponding entry in the source LSU mapping table. Following performance of the step 906 or 908, control may transfer back to the step 910, where the target state of the data portion for the target LSU may be changed from undefined to defined; e.g., the target state column 712 of the entry 702 of the data portion in the target LSU, or the bit in a bitmap for the target LSU may be set equal to "1." Following performance of the step 910, the method 900 may return to the step 902.

Figure 10B:
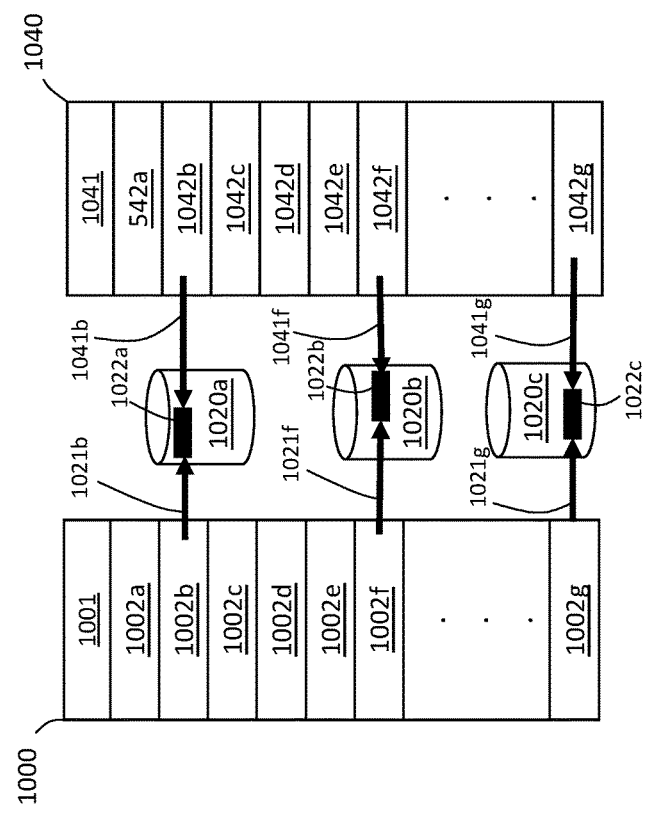
Figure 10A:
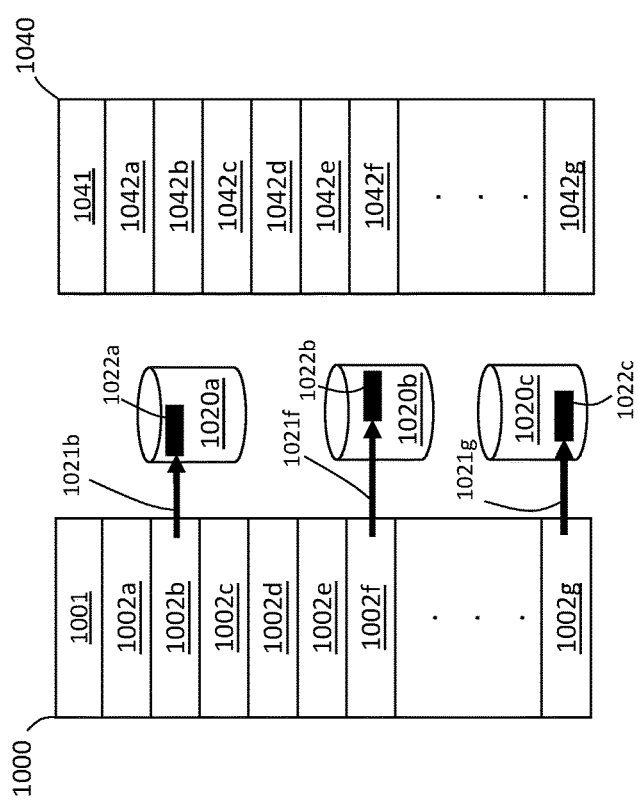

FIGS. 10A-10E are block diagrams illustrating an example of the creation and use of a clone of an LSU according to embodiments of the invention. A source mapping table 1000 includes an LSU header 1001 (e.g., 701) and a plurality of entries 1002a-g (e.g., entries 702a-g). A target mapping table 1040 includes an LSU header 1041 (e.g., 701); and a plurality of entries 1042a-g (e.g., entries 702a-g) that correspond to entries 1002a-g. FIG. 10A illustrates a state of the source mapping table 1000 and target mapping table 1040 with respect to entries 1002b, f and g and entries 1042b, f and g prior to performance of the step 804 of the method 800. For illustrative purposes, only entries 1002b, f and g and entries 1042b, f and g of mapping tables 1000 and 1040 will be described. As shown in FIG. 10A, prior to performance of the step 804: the entry 1002b specifies (e.g., points to) physical location 1022a of physical storage device 1020a allocated to the data portion represented by the entry 1002b, as indicated by reference arrow 1021b; the entry 1002f specifies (e.g., points to) physical location 1022b of physical storage device 1020b allocated to the data portion represented by the entry 1002f, as indicated by reference arrow 1021f; and the entry 1002g specifies (e.g., points to) physical location 1022c of physical storage device 1020c allocated to the data portion represented by the entry 1002g, as indicated by reference arrow 1021g. Each entry may specify its respective physical location in a physical location column 706 (not shown).

FIG. 10B illustrates a state of the source mapping table 1000 and target mapping table 1040 with respect to entries 1002b, f and g and entries 1042b, f and g after the performance of the step 908 of the method 900 (e.g., as part of performance of the step 804) for each of the entries 1042b, f and g. As indicated by reference arrows 1041b, 1041f and 1041g, after the performance of the step 908 for each of the entries 1042b, f and g of the target mapping table 1040, these entries now specify the same physical locations 1022a, 1022b and 1022c of their corresponding entries 1002b, f and g, respectively, in the source mapping table 1000. That is, for each data portion of the target LSU, after performance of the step 908 (and prior to any subsequent write operations to the respective data portion), the source and target LSUs share a same allocated physical location for the data portion. Also, while not shown in FIGS. 10A and 10 B, after performance of the step 910 for each of the target states bits of the entries 1042*b*, *f* and *g*, the state bits of each of these entries may changes from undefined to defined, as described in more detail elsewhere herein.

Returning to the method 800, in a step 806 the target LSU may be activated such that it is now available to process I/O operations for one or more host systems. While the target LSU may be activated prior to the completion of the define process for the target LSU, it may be desirable to wait until the completion of the define process initiated in the step 804 before activating the target LSU. It may be desirable to wait until completion to avoid the potential additional resource consumption and performance degradation described in more detail elsewhere herein if write operations are received on the source or target LSUs for data portions that have not yet been defined, That is, it may be desirable to fully prepare the target LSU for activation by completing the define process prior to activating the target LSU.

Activating the target LSU may include at least: incrementing the sequence number of the source LSU and incrementing the sequence number of the target LSU; and enabling access to the target LSU by one or more host systems. For example, for the source LSU, the source sequence number 709 of its LSU mapping data structure may be incremented, and, for the target LSU, the target sequence number 710 of its LSU mapping data structure may be incremented. However, in such embodiments, none of the DP source sequence numbers in column 708 of the entries 702 of the source mapping table may be incremented, and none of the DP target sequence numbers in column 710 of the entries 702 of the target mapping table may be incremented. Accordingly, as a result of the activation, for both the source LSU and the target LSU, the sequence numbers of the LSU themselves are out of sync (i.e., are different (e.g., greater) than) their constituent data portions. A reason for making the sequence numbers of the LSUs and their constituent data portions different is to be able to determine a first write to a source LSU or target LSU after activation, and take action accordingly, as is described in more detail elsewhere herein.

In addition to updating sequence numbers, activating the target LSU may involve updating the LSU status field 707 of the target mapping table to indicate clone metadata 707 of the source mapping table and the target mapping table of the source LSU and target LSU, respectively, to indicate that the target LSU has been activated.

Figure 11:
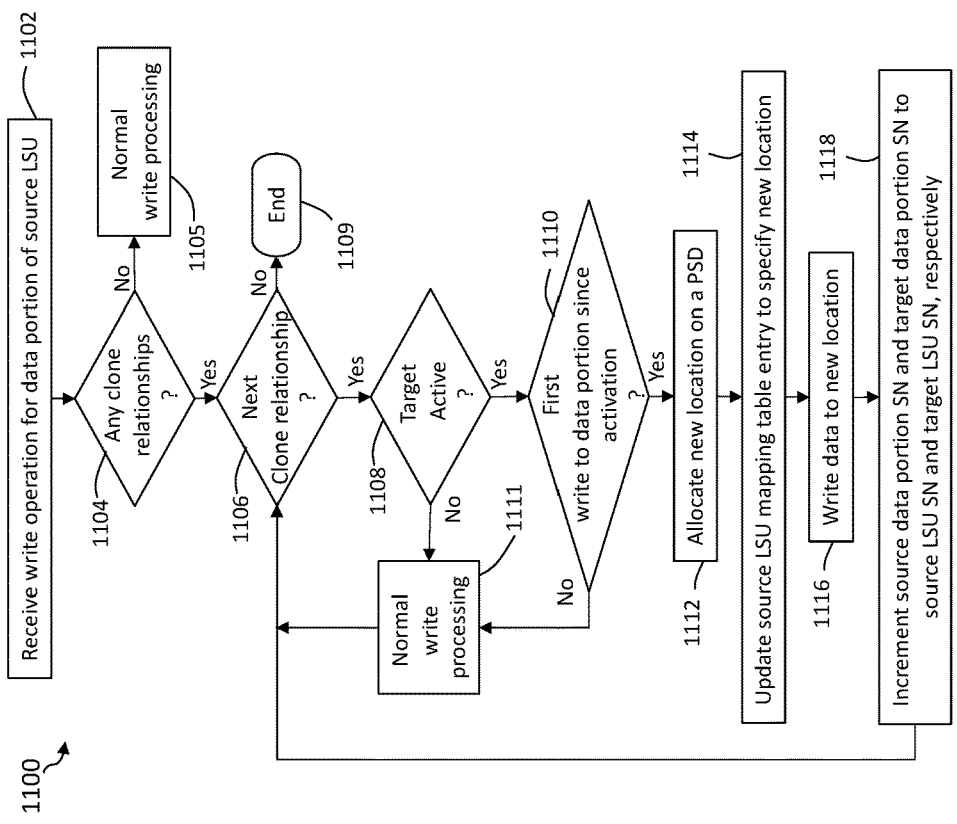
FIG. 11 is a flowchart illustrating an example of a method of handling a write operation for a source logical storage unit, according to embodiments of the invention.
Figure 10E:
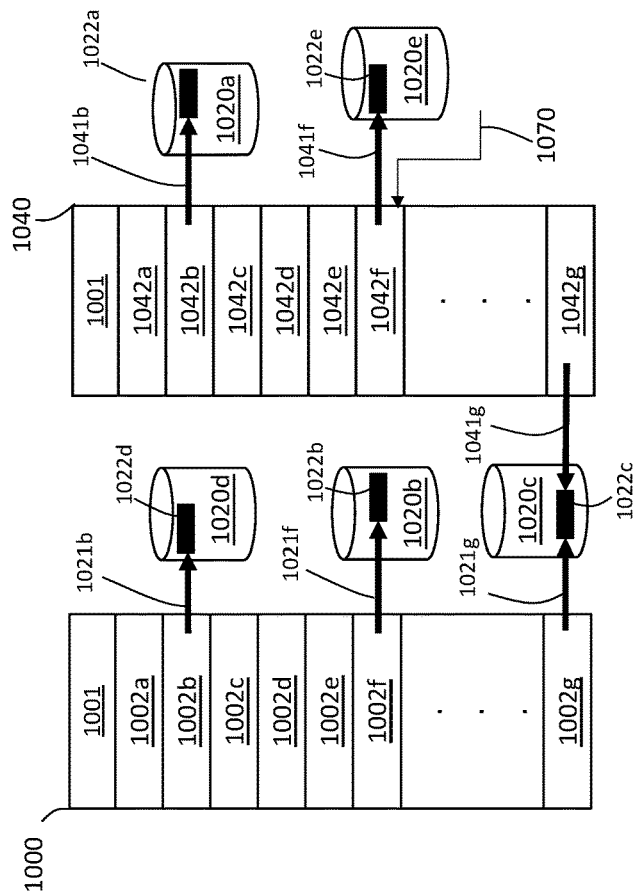

FIG. 11 is a flowchart illustrating an example of a method 1100 of handling a write operation for a source LSU, according to embodiments of the invention. Other embodiments of a method of handling a write operation for a source LSU, for example, variations of the method 1100, are possible and are intended to fall within the scope of the invention.

In a step 1102, a write operation may be received (e.g., from a host system) for a data portion of an LSU. For example, a write operation that specifies one or more data portions that includes the data portion is received. In a step 1104, it may be determined whether there are any clone relationships including the LSU specified in the write operation. For example, the clone metadata 707 for the LSU may be examined. It is determined in the step 1104 that there are no clone relationships defined for the LSU, the normal write processing may be undertaken in a step 1105; i.e., whatever processing is performed when there are no clone relationships.

If it determined in the step 1104 that there are clone relationships defined for the LSU, then clone processing for each clone relationship may be performed, for example, by iterative performance of steps 1106-1118 for each clone relationship. In a step 1106, it may be determined whether there is a next clone relationship, which should always be the case when arriving at the step 1106 from 1104, but not necessarily true for future iterations. The step 1106 may include accessing the clone metadata 707 of the LSU, which may specify: a role of the LSU (e.g., target or source) in the clone relationship; the LSU ID of (or reference or other pointer to) the other LSU in the LSU relationship; the activation status (e.g., active, inactive) of the target LSU in the clone relationship; and other information.

If it is determined in the step 1106 that there is not a next clone relationship, the method 1100 may end. If it is determined in the step 1106 that there is a next clone relationship, then in step 1108 it may be determined (e.g., from the clone metadata) whether the target LSU is active, for example, by accessing the clone metadata. If not, then in a step 1111 normal write processing may be undertaken, for example, the write data may be de-staged from cache to the allocated physical location for the data portion per typical write processing. For example, FIG. 10C reflects write operations 1050*a-c* being received for data portions 1002*b, c* and *g* before the target LSU is activated. The data for each data portion may be written to physical locations 1002*a, b* and *c*, respectively, without any changes to the source mapping table 1000 or the target mapping table 1040.

If it is determined in the step 1108 that the target is active, then in a step 1110, it may be determined whether the write operation is a first (in a temporal sense) write operation to the data portion since the target LSU was activated. The step 1110 may include comparing the source sequence number of the data portion (e.g., specified in column 708 of the entry representing the data portion) to the source sequence number of the source LSU, e.g., the source sequence number 709. If the values are the same (i.e., they match), it may be concluded that the write operation is not a first write operation since the target LSU was activated. Otherwise, if the values are different, it may be concluded that the write operation is the first write operation since the target LSU was created.

If it is determined that the write operation is not a first write operation (e.g., the source sequence number of the data portion is the same as the source sequence number of the LSU), then method 1100 may proceed to the step 1111. Otherwise, the method 1100 may proceed to performing steps 1112-1116. In the step 1112, a new physical location on a physical storage device may be allocated to the data portion of the source LSU, and the LSU mapping table updated accordingly in a step 1114. For example, the value of the physical location specified in column 706 of the one or the entries 702 representing the data portion may be updated to specify the new physical location. For example, FIG. 10D reflects a write operation 1060 for the data portion corresponding to the entry 1002*b* being received after the target LSU 1040 has been activated. New physical location 1022*d* of physical storage device 1020*d* may be allocated to the data portion, and the entry 1002*b* may be updated by updating the reference 1021*b* to specify the new physical location 1022*d*.

In a step 1116, the data of the write operation may be written to the new physical location (e.g., 1022d). In a step 1118, the source sequence number for the data portion in the source mapping structure (e.g., the value in column 708) may be updated (e.g., incremented) to be equal to the source number of the source LSU (e.g., 709), and the target sequence number for the data portion in the target mapping structure (e.g., the value in column 710) may be updated (e.g., incremented) to be equal to the target sequence number of the target LSU (e.g., 711). By updating the data portion sequence numbers to match their respective LSU sequence numbers, if a next I/O operation is received for the data portion on the source LSU or target LSU before a next clone is created, then performance of the step 1110 (or step 1212 described elsewhere herein) will determine that the write operation is not a first write operation since the target LSU was activated.

Figure 12:
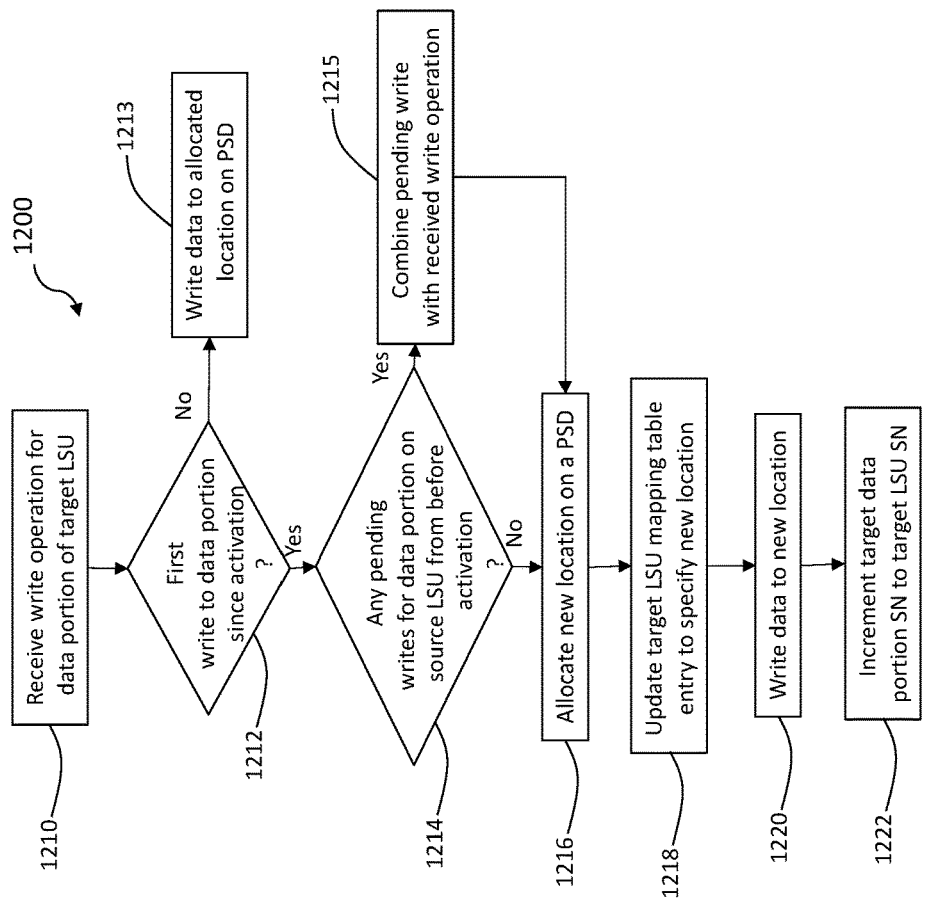
FIG. 12 is a flowchart illustrating an example of a method of handling a write operation for a target logical storage unit, according to embodiments of the invention.

FIG. 12 is a flowchart illustrating an example of a method 1200 of handling a write operation for a target LSU, according to embodiments of the invention. Other embodiments of a method of handling a write operation for a target LSU, for example, variations of the method 1200, are possible and are intended to fall within the scope of the invention.

In a step 1210, a write operation for a data portion of the target LSU may be received. Although not illustrated in FIG. 12, in a next step it may be determined whether there are any clone relationships including the LSU specified in the write operation. For example, the clone metadata 707 for the target LSU may be examined, and it may be determined that the target LSU is a target for a source LSU, and steps 1212-1222 may be performed.

In step 1212, it may be determined whether the write operation is a first write operation to the data portion since activation of the target LSU. The step 1212 may include comparing the target sequence number of the data portion (e.g., specified in column 710 of the entry representing the data portion) to the target sequence number of the target LSU, e.g., the target sequence number 711. If the values are the same (i.e., they match), it may be concluded that the write operation is not a first write operation since the target LSU was activated. Otherwise, if the values are different, it may be concluded that the write operation is the first write operation since the target LSU was created.

If it is determined in the step 1212 that the write operation is not the first write operation since the target LSU was activated, then in a step 1213 the data of the write operation may be written to the shared physical location for the data portion without updating the mapping table of the source or the target. For example, the write data may be de-staged from cache to the allocated physical location for the data portion per typical write processing.

If it is determined in the step 1212 that the write operation is the first write operation since the target LSU was activated, then in a step 1214 it may be determined whether there are any pending writes for the data portion on the source LSU that were pending before the activation of the target LSU. If so, then in a step 1215, the pending write operation may be combined with the received write operation. After performance of the step 1215, or if it is determined in the step 1215 that there were not any pending writes for the data portion on the source LSU that were pending before the activation of the target LSU, the method 1200 may proceed to the steps 1216-1222.

In the step 1216, a new physical location on a physical storage device (PSD) may be allocated to the data portion of the target LSU, and the target LSU mapping table updated accordingly in a step 1218. For example, the value of the physical location specified in column 706 of the one or the entries 702 representing the data portion in the target LSU may be updated to specify the new physical location. For example, FIG. 10E reflects a write operation 1070 for the data portion corresponding to the entry 1042f being received after the target LSU 1040 has been activated. New physical location 1022e of physical storage device 1020e may be allocated to the data portion, and the entry 1042f may be updated by updating the reference 1041f to specify the new physical location 1022e.

In a step 1220, the data of the write operation, or the combined data of the write operation and any pending write operations (as determined in the step 1214), may be written to the new physical location (e.g., 1022e). In a step 1222, the source sequence number for the data portion in the source mapping structure (e.g., the value in column 708) may be updated (e.g., incremented) to be equal to the source number of the source LSU (e.g., 709), and the target sequence number for the data portion in the target mapping structure (e.g., the value in column 710) may be updated (e.g., incremented) to be equal to the target sequence number of the target LSU (e.g., 711). By updating the data portion sequence numbers to match their respective LSU sequence numbers, if a next I/O operation is received for the data portion on the source LSU or target LSU before a next clone is created, then performance of the step 1212 (or step 1110 described elsewhere herein) will determine that the write operation is not a first write operation for the data portion since the target LSU was activated.

Although methods 1100 and 1200 are described in relation to FIGS. 11 and 12 as being performed on separate LSUs, e.g., a source and target LSU for an LSU relationship, it should be appreciated that method 1100 and 1200, or parts thereof, may be performed for a single LSU when a write operation is received by the LSU if the LSU serves as a source LSU for one or more target LSUs and as a target LSU for another LSU. In such embodiments, the steps of methods 1100 and 1200 may be performed in various orders and/or combined in various ways.

Although methods 1100 and 1200 are described in relation to FIGS. 11 and 12 as being performed on separate LSUs, e.g., a source and target LSU for an LSU relationship, it should be appreciated that method 1100 and 1200, or parts thereof, may be performed for a single LSU when a write operation is received by the LSU if the LSU serves a source LSU for one or more target LSUs and as a target LSU for another LSU. In such embodiments, the steps of methods 1100 and 1200 may be performed in various orders and/or combined in various ways.

Figure 13:
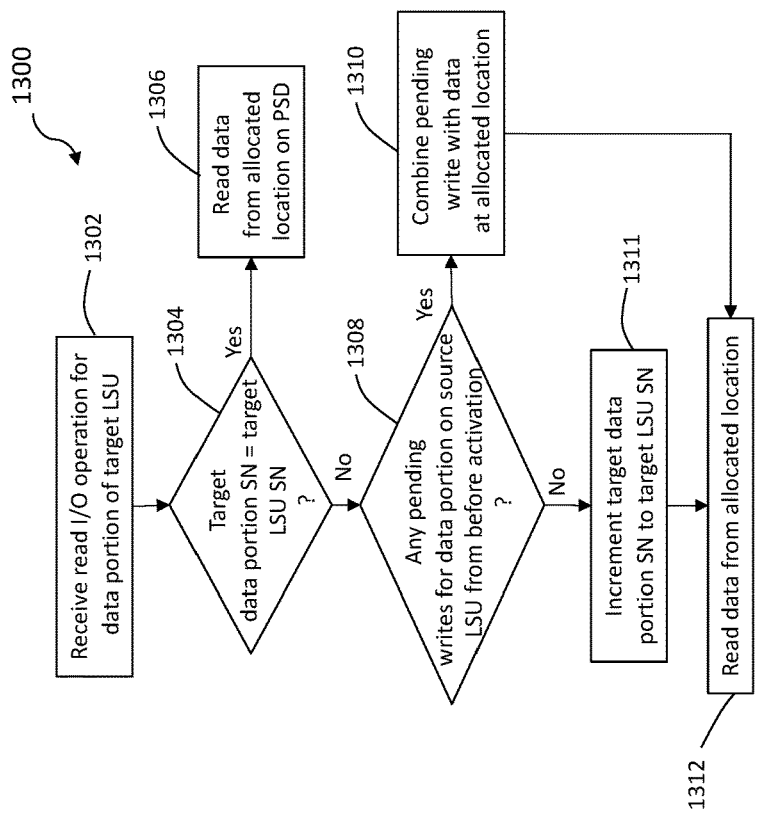
FIG. 13 is a flowchart illustrating an example of a method of handling a read operation for a target logical storage unit, according to embodiments of the invention.

FIG. 13 is a flowchart illustrating an example of a method 1300 of handling a read operation for a target LSU, according to embodiments of the invention. Other embodiments of a method of handling a read operation for a target LSU, for example, variations of the method 1300, are possible and are intended to fall within the scope of the invention.

In a step 1302, a read operation for a data portion of the target LSU may be received. Although not illustrated in FIG. 12, in a next step it may be determined whether there are any clone relationships including the LSU specified in the write operation. For example, the clone metadata 707 for the target LSU may be examined, and it may be determined that the target LSU is a target for a source LSU, and steps 1304-1310 may be performed.

In step 1304, it may be determined whether the target sequence number of the data portion (e.g., specified in column 710 of the entry representing the data portion) is the same as the target sequence number of the target LSU, e.g., the target sequence number 711. If the values are the same (i.e., they match), then in a step 1306 the data of the read operation may be read from the shared physical location for the data portion without updating the mapping table of the source or the target.

If it is determined in the step 1304 that the target sequence number of the data portion and the target sequence number of the target LSU are not the same (i.e., they do not match), then in a step 1308 it may be determined whether there are any pending writes for the data portion on the source LSU that were pending before the activation of the target LSU. If so, then in a step 1310, the data of the pending write operation may be combined with the data at the allocated physical location. After performance of the step 1310, or if it is determined in the step 1308 that there were not any pending writes for the data portion on the source LSU that were pending before the activation of the target LSU, the method 1300 may proceed to a step 1311.

In the step 1311, the source sequence number for the data portion in the source mapping structure (e.g., the value in column 708) may be updated (e.g., incremented) to be equal to the source number of the source LSU (e.g., 709), and the target sequence number for the data portion in the target mapping structure (e.g., the value in column 710) may be updated (e.g., incremented) to be equal to the target sequence number of the target LSU (e.g., 711). By updating the data portion sequence numbers to match their respective LSU sequence numbers, if a next I/O operation is received for the data portion on the source LSU or target LSU before a next clone is created, then performance of the step 1304, 1212 or 1110 will determine that the I/O operation is not the first I/O operation for the data portion since the target LSU was activated.

In a step 1312, the data of the read operation may be read from the allocated location for the data portion.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 800, 900, 1100, 1200 and 1300, or parts thereof, may be implemented using one or more of the systems and/or data structures described in relation to FIGS. 1-7, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a system including a plurality of physical storage devices for storing data and a plurality of logical storage units, each logical storage unit including a plurality of data portions, each data portion corresponding to one or more physical locations within the plurality of physical storage devices, a method of establishing a target logical storage unit as a point-in-time image of a source logical storage unit, the method comprising:

initiating an establishing of the target logical storage unit as the point-in-time image of the source logical storage unit using metadata associated with the source logical storage unit;

initiating a defining of a state of a target mapping table to map data portions of the target logical storage unit to physical locations on the plurality of physical storage devices that are mapped to data portions of the source logical storage unit corresponding to the data portions of the target logical storage device;

after initiating the defining, activating the target logical storage unit, including enabling access to the target logical storage unit by one or more host systems;

receiving an I/O operation specifying a data portion of the target logical storage unit;

determining, for a data portion of the source target storage unit corresponding to the specified data portion of the target logical storage unit, that that there is a pending write operation for the corresponding data portion that was pending before the activating of the target logical storage unit;

combining data of the pending write operation with data specified by the received I/O operation; and storing the combined data at a first physical location on the plurality of physical storage devices allocated to the specified data portion of the target logical storage unit, wherein neither the data of the pending write operation nor the data specified by the received I/O operation are stored on one or more physical storage devices before the data of the pending write operation and the data specified by the received I/O operation are combined.

2. The method of claim 1, wherein the target mapping table includes a plurality of entries, each entry representing a data portion of the target logical storage unit, and wherein the defining includes, for each entry of the target mapping table:

accessing a corresponding entry in a source mapping table;

determining whether the corresponding entry specifies a physical location on the plurality of devices allocated to the data portion; and if the corresponding entry specifies a physical location, updating the entry in the target mapping table for the data portion to specify the physical location.

3. The method of claim 1, wherein the defining of the state of the target mapping table is completed before the activating of the target logical storage unit.

4. The method of claim 1, further comprising:

after initiating the establishing of the target logical storage unit and prior to the activating of the target logical storage unit, receiving a write operation for a data portion of the source logical storage unit; and writing data of the write operation to an allocated location on the plurality of physical devices specified by an entry of a source data structure representing the data portion, wherein the writing is performed without allocating any new physical locations on the plurality of storage devices to the source logical storage unit or the target logical storage unit.

5. The method of claim 4, wherein the data is written to the allocated location without modification of either of the target mapping table or a source mapping table that maps data portions of the source logical storage unit to physical locations on the plurality of physical storage devices.

6. The method of claim 1, further comprising:

after the activating of the target logical storage unit, receiving a write request for a first data portion of the source logical storage unit;

determining whether the write request is a first write request for the first data portion since the target logical storage unit was activated; and if it is determined that the write request is the first write request for the first data portion since the target logical storage unit was activated:

allocating a new physical location on the plurality of physical storage devices to first data portion for the source logical storage unit;

updating an entry of a source mapping table of the source logical storage unit corresponding to first data portion to specify the new physical location; and writing the data of the write request to the new physical location.

7. The method of claim 1, the method further comprising:

after activating the target logical storage unit, updating a sequence number of the source logical storage unit and updating a sequence number of the target logical storage unit.

8. A system comprising:

a plurality of physical storage devices for storing data;

a plurality of logical storage units, each logical storage unit including a plurality of data portions, each data portion corresponding to one or more physical locations within the plurality of physical storage devices; and memory having code stored thereon that, when executed, performs a method including:

initiating an establishing of a target logical storage unit as a point-in-time image of a source logical storage unit using metadata associated with the source logical storage unit;

initiating a defining of a state of a target mapping table to map data portions of the target logical storage unit to physical locations on the plurality of physical storage devices that are mapped to data portions of the source logical storage unit corresponding to the data portions of the target logical storage device;

after initiating the defining, activating the target logical storage unit, including enabling access to the target logical storage unit by one or more host systems;

receiving an I/O operation specifying a data portion of the target logical storage unit;

determining, for a data portion of the source target storage unit corresponding to the specified data portion of the target logical storage unit, that that there is a pending write operation for the corresponding data portion that was pending before the activating of the target logical storage unit;

combining data of the pending write operation with data specified by the received I/O operation; and storing the combined data at a first physical location on the plurality of physical storage devices allocated to the specified data portion of the target logical storage unit, wherein neither the data of the pending write operation nor the data specified by the received I/O operation are stored on one or more physical storage devices before the data of the pending write operation and the data specified by the received I/O operation are combined.

9. The system of claim 8, wherein the target mapping table includes a plurality of entries, each entry representing a data portion of the target logical storage unit, and wherein the defining includes, for each entry of the target mapping table:

accessing a corresponding entry in a source mapping table;

determining whether the corresponding entry specifies a physical location on the plurality of devices allocated to the data portion; and if the corresponding entry specifies a physical location, updating the entry in the target mapping table for the data portion to specify the physical location.

10. The system of claim 8, wherein the defining of the state of the target mapping table is completed before the activating of the target logical storage unit.

11. The system of claim 8, wherein the method further comprises:

after initiating the establishing of the target logical storage unit and prior to the activating of the target logical storage unit, receiving a write operation for a data portion of the source logical storage unit; and writing data of the write operation to an allocated location on the plurality of physical devices specified by an entry of a source data structure representing the data portion, wherein the writing is performed without allocating any new physical locations on the plurality of storage devices to the source logical storage unit or the target logical storage unit.

12. The system of claim 11, wherein the data is written to the allocated location without modification of either of the target mapping table or a source mapping table that maps data portions of the source logical storage unit to physical locations on the plurality of physical storage devices.

13. The system of claim 12, wherein the method further comprises:

after the activating of the target logical storage unit, receiving a write request for a first data portion of the source logical storage unit;

determining whether the write request is a first write request for the first data portion since the target logical storage unit was activated; and if it is determined that the write request is the first write request for the first data portion since the target logical storage unit was activated:

allocating a new physical location on the plurality of physical storage devices to first data portion for the source logical storage unit;

updating an entry of a source mapping table of the source logical storage unit corresponding to first data portion to specify the new physical location; and writing the data of the write request to the new physical location.

14. The system of claim 8, wherein the method further comprises:

after activating the target logical storage unit, updating a sequence number of the source logical storage unit and updating a sequence number of the target logical storage unit.

15. For a system including a plurality of physical storage devices for storing data and a plurality of logical storage units, each logical storage unit including a plurality of data portions, each data portion corresponding to one or more physical locations within the plurality of physical storage devices, one or more non-transitory computer-readable media having software stored thereon comprising software defining a method of establishing a target logical storage unit as a point-in-time image of a source logical storage unit, the software comprising:

executable code that initiates an establishing of the target logical storage unit as the point-in-time image of the source logical storage unit using metadata associated with the source logical storage unit;

executable code that initiates a defining of a state of a target mapping table to map data portions of the target logical storage unit to physical locations on the plurality of physical storage devices that are mapped to data portions of the source logical storage unit corresponding to the data portions of the target logical storage device;

executable code that, after initiating the defining, activates the target logical storage unit, including enabling access to the target logical storage unit by one or more host systems;

executable code that receives an I/O operation specifying a data portion of the target logical storage unit;

executable code that determines, for a data portion of the source target storage unit corresponding to the specified data portion of the target logical storage unit, that that there is a pending write operation for the corresponding data portion that was pending before the activating of the target logical storage unit;

executable code that combines data of the pending write operation with data specified by the received I/O operation; and executable code that stores the combined data at a first physical location on the plurality of physical storage devices allocated to the specified data portion of the target logical storage unit, wherein neither the data of the pending write operation nor the data specified by the received I/O operation are stored on one or more physical storage devices before the data of the pending write operation and the data specified by the received I/O operation are combined.

16. The one or more non-transitory computer-readable media of claim 15, wherein the target mapping table includes a plurality of entries, each entry representing a data portion of the target logical storage unit, and wherein the defining includes, for each entry of the target mapping table:

accessing a corresponding entry in a source mapping table;

determining whether the corresponding entry specifies a physical location on the plurality of devices allocated to the data portion; and if the corresponding entry specifies a physical location, updating the entry in the target mapping table for the data portion to specify the physical location.

17. The one or more non-transitory computer-readable media of claim 15, wherein the defining of the state of the target mapping table is completed before the activating of the target logical storage unit.

18. The one or more non-transitory computer-readable media of claim 15, wherein the software further comprises:

executable code that, after initiating the establishing of the target logical storage unit and prior to the activating of the target logical storage unit, receives a write operation for a data portion of the source logical storage unit; and executable code that writes data of the write operation to an allocated location on the plurality of physical devices specified by an entry of a source data structure representing the data portion, wherein the writing is performed without allocating any new physical locations on the plurality of storage devices to the source logical storage unit or the target logical storage unit.

19. The one or more non-transitory computer-readable media of claim 18, wherein the data is written to the allocated location without modification of either of the target mapping table or a source mapping table that maps data portions of the source logical storage unit to physical locations on the plurality of physical storage devices.

20. The one or more non-transitory computer-readable media of claim 19, wherein the software further comprises:

executable code that, after the activating of the target logical storage unit, receives a write request for a first data portion of the source logical storage unit;

executable code that determines whether the write request is a first write request for the first data portion since the target logical storage unit was activated; and executable code that, if it is determined that the write request is the first write request for the first data portion since the target logical storage unit was activated controls:

allocating a new physical location on the plurality of physical storage devices to first data portion for the source logical storage unit;

updating an entry of a source mapping table of the source logical storage unit corresponding to first data portion to specify the new physical location; and writing the data of the write request to the new physical location.

* * * * *